United States Patent Office 3,014,081
Patented Dec. 19, 1961

3,014,081
SYNTHESIS OF LONG CHAIN ALKYLATED AROMATIC COMPOUNDS
Clyde Lee Aldridge and Edward Allen Hunter, Baton Rouge, La., assignors to Esso Research and Engineering Company, a corporation of Delaware
No Drawing. Filed Apr. 16, 1959, Ser. No. 806,785
10 Claims. (Cl. 260—671)

This invention relates to a novel process for the synthesis of alkylated aromatic compounds suitable for use as intermediates for high molecular weight oil soluble detergents. More specifically, this invention relates to a process for telomerizing a certain $C_5$ to $C_8$ olefin, having at least one alkyl substituent attached to an internal non-olefinic carbon atom, with a benzene series compound. The process in effect comprises telomerization of the aforesaid olefin and a compound of the benzene series in the presence of certain acidic catalysts under conditions which will be indicated subsequently. Still more particularly, this invention relates to the selective preparation of monoalkylated benzene wherein said alkyl group contains from about 2 to 15 monomeric olefin units.

For the preparation of alkaryl compounds, aromatic compounds have in the past been alkylated by various techniques including condensation reactions with alkyl halide and direct alkylation with an olefin in the presence of an alkylation catalyst. A more recent proposal for producing alkylated aromatic compounds comprises the reaction of benzene or other low molecular weight aromatics such as toluene, xylene, cumene and the like with a light olefin, e.g., ethylene, in the presence of an initiator which will effect the generation of free radicals to permit a build-up of monomer units to a long chain alkyl group. In such a free radical telomerization reaction the light olefin can grow on to the benzene compound to a molecular weight of about 1500 and higher. These prior art processes have, however, several inherent deficiencies. These deficiencies include in the case of the former reaction a sometimes uncontrollable formation of di- and tri-alkylated product which are usually undesirable and limitations with respect to the olefin employed in the case of the latter.

The present invention comprises telomerization with a positively charged hydrocarbon radical, i.e., carbonium ions.

It has now been found that benzene or its homologues may be reacted with certain olefins in the presence of acidic catalysts at relatively low temperatures to produce a telomer which is predominantly monoalkylated in the case of benzene. With toluene, xylene, etc. the original methyl groups on the benzene ring are untouched and the long chain alkyl radical attaches directly to the ring. These olefins which telomerize in this manner comprise principally the $C_5$ to $C_8$ alpha olefins having at least one alkyl group attached to an internal non-olefinic carbon atom. Thus, the olefin coming within the scope of this invention may be characterized by the following formula, $CH_2=CH-R$, wherein R represents a saturated branched hydrocarbon radical. Alternatively, the olefins of the invention may be characterized as monosubstituted ethylenes in which the substituent is a branched alkyl radical or cycloalkyl radical, the total number of carbon atoms in the molecule being from 5 to 8.

Typical olefins which fall under this definition include 3-methyl butene-1, 3-methyl pentene-1, 3-methyl hexene-1, 3-methyl heptene-1, 4-methyl pentene-1, 4-methyl hexene-1, 4-methyl heptene-1, 5-methyl hexene-1, 5-methyl heptene-1, 3-ethyl butene-1, 3-ethyl pentene-1, 4-ethyl hexene-1, 3,3-dimethyl butene-1, 3,3-dimethyl pentene-1, 3,4-dimethyl pentene-1, etc. Also to be included are the alkylene substituted cycloparaffins such as allyl cyclopentane,

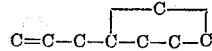

and vinyl cyclohexane

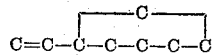

It has been found that non-alpha olefins in general as well as alpha olefins having a methyl or other alkyl substituent on an olefinic carbon atom do not react in the same manner as the olefins within the scope of the present invention.

To selectively prepare the high molecular weight monoalkylated aromatics of this invention, it is necessary to employ an acidic catalyst, preferably a halide containing catalyst and more preferably a Lewis acid such as aluminum chloride, aluminum bromide, iron chloride, tin halide, titanium halide, boron halide, etc. The acidic catalyst is added in the amount of from 0.1 to 10% based on olefin present. The concentration is carefully controlled to avoid runaway polymerization of the olefin and thus a loss of selectivity to the desired telomer. If desired co-catalysts such as water, HCl, alcohol, HBr or any of the known co-catalysts and/or modifiers common to the alkylation art may be employed.

As the aromatic reactant, there may be employed benzene, toluene, xylene, cumene, or in fact any of the low molecular weight aromatic compounds. Benzene is particularly preferred since it lends itself to the preparation of monoalkylated benzene having a sufficiently high molecular weight and alkyl branchiness to provide an excellent hydrophobic moiety for the ultimate preparation of soluble detergent additives for oil products. The alkylated benzene product must, of course, be sulfonated and neutralized to produce these additives.

The ratio of the benzene compound to olefin is not regarded as critical; however, the use of over stoichiometric amounts of the aromatic reactant is preferred. A benzene to olefin ratio of as high as 20 to 1 may be employed if desired. In the reaction the benzene or other aromatic feed may be employed as the solvent for the olefin and the catalyst added thereto; however, to provide the reaction mixture with a high ratio of benzene to olefin, the latter may be added incrementally throughout the reaction. Similarly, the catalysts may be added in small increments where the olefin feed has a high affinity towards uncontrollable polymerization which is to be avoided. In a continuous system, the catalyst, olefin, and aromatics may be fed into the reactor in a single stream or separately as desired.

Reaction temperatures should be maintained between −80° C. and +50° C. and preferably −30 to +30. Residence time within the reactor under batch conditions for complete conversion will vary between 30 minutes to 2 hours; however, in a continuous system the feed rates may be adjusted to produce the optimum product yield and distribution.

As indicated by the examples, the reaction may be run at atmospheric pressure, although super-atmospheric pressures of up to about 100 p.s.i.g. may be employed if desired. Since the olefins employable in this process are soluble in the aromatic reactants, the process may be run substantially completely in liquid phase under atmospheric pressure.

While it is believed that the present reaction involves carbonium ion telomerization, the exact mechanism is not completely understood. Thus, it does not appear obvious as to why certain classes of olefins are operable for the present process while other homologous olefins are substantially inoperative. For a more complete understanding of the present invention, reference may now be had to the following specific examples.

Example 1

390.5 grams (5 mols) of benzene were added to a one-liter flask fitted with stirring apparatus. To the benzene there was added 1 gram of finely ground aluminum chloride containing trace amounts of water, the reaction vessel being maintained under atmospheric conditions. 84.2 grams (1 mol) of 4-methyl pentene-1 were then added over a period of 50 minutes and the temperature within the reaction mixture was maintained principally between 5–27° C. with the aid of an ice bath. The average temperature was about 17° C. At the end of 50 minutes 0.8 gram of additional aluminum chloride was added with stirring to insure completion of reaction and finally 10 cc. of water was added. The water functioned to inactivate the aluminum chloride. The water layer was separated from the organic layer and after several washings with dilute HCl and $H_2O$ the hydrocarbon product minus solvent was analyzed. Olefin conversion was substantially 100% with an 83 mole percent selectivity to high molecular weight monoalkylated benzene. By high molecular weight it is meant that the alkyl chain contains at least two monomer units.

Light alkylate (principally $C_5$ alkyl benzene) _____ Nil
Heavy alkylate _____ wt. percent__ 100
(705 avg. mol. wt.) _____ grams__ 91.5
Monoalkyl groups
  by infrared analyses) _____mole percent__ 83

From the above experiment it is seen that a monoalkylated benzene, the alkyl group of which contains an average of approximately 7.5 times the number of carbon atoms in the starting olefin, may be obtained by this process. This product when sulfonated by known techniques is a suitable oil soluble detergent additive.

Example 2

The procedure of Example 1 is repeated employing 5 moles of benzene and 0.5 mole of 3-methyl butene-1 with 1 gram of $AlCl_3$. The product is worked up as in Example 1 with a 100% conversion to heavy product and a high selectivity to monoalkylated benzene suitable for use as an intermediate for the production of oil soluble alkylated aromatic sulfonated detergent additives.

Example 3

The procedure of Example 1 is repeated employing 5 moles of toluene and 0.5 mole of 4,4-dimethyl pentene-1 with 1.5 grams $BF_3$ added incrementally over a period of 60 minutes. Temperatures are maintained with an ice bath between −30 to 0° C. Conversion with $BF_3$ catalysis is also 100% with high selectivity to long chain alkylated aromatics having at least two monomeric olefin units in the chain. In this case with toluene the alkyl groups add directly to the ring without disturbing the methyl group.

To demonstrate further the unique characteristics of the particular olefins employed, reference is now had to the following table which compares a number of runs utilizing an olefin falling within the scope of the present invention and homologous olefins which are essentially inoperative for the intended purpose. The technique employed was the same as described in Example 1.

| Run No. | 1 | 2 | 3 | 4 | 5 | 6 |
|---|---|---|---|---|---|---|
| Olefin, Name | Pentene-1 | 4-Methyl Pentene-1 | 4-Methyl Pentene-1 | 2-Methyl Pentene-1 | 4-Methyl Pentene-2 | 2-Methyl Pentene-2 |
| Conditions: | | | | | | |
| Aromatic— | | | | | | |
| Name | Benzene | Benzene | Benzene | Benzene | Benzene | Benzene. |
| Amount (grams) | 390.5 | 390.5 | 390.5 | 390.5 | 390.5 | 390.5. |
| Avg. Temp., °C. (ice bath) | 15 | 20 | 25 | 25 | 25 | 25. |
| Olefin, Amount Grams | 70.1 | 84.2 | 41.7 | 42.1 | 42.1 | 42.1. |
| Olefin, Conversion, percent | 100 | 100 | 100 | 100 | 95 | 100. |
| Catalyst, Name (trace amounts of $H_2O$ present) | $AlCl_3$ | $AlCl_3$ | $AlCl_3$ | $AlCl_3$ | $AlCl_3$ | $AlCl_3$. |
| Catalyst, grams | 2.0 | 1.8 | 1.0 | 1.1 | 4.0 | 3.2. |
| Total Product: | | | | | | |
| Amount (grams) | 124.7 | 91.5 | 42.4 | 34.1 | 27.0 | 44.9. |
| Mol. wt. | 223 | 705 | 598 | | 196 | 192. |
| Monoalkyl Aromatics, Mol percent | | 83 | 65 | | 22 | 25. |
| Olefin, Mole percent | | 0.3 | 0.1 | | 50 | |
| Light Product: | | | | | | |
| Percent of Total Product | 70 | Nil | Nil | 19 | 62 | 42. |
| Mol wt | | | | | 161 | 144. |
| Monosubst. Arom., Mol. percent | Amyl Benzene | | | | 20 | 35. |
| Olefin, Mole percent | Amyl Benzene | | | | 39 | |
| Heavy Product: | | | | | | |
| Percent of Total product | 30 | 100 | 100 | 81 | 38 | 58. |
| Mol. wt. | 298 | 705 | 598 | 340 | 246 | 256. |
| Monoalkyl Aromatics, Mol. percent | | 83 | 65 | 19 | 27 | 23. |
| Olefin, Mole percent | | 0.3 | 0.1 | 53 | 69 | |

In the table it is noted that only the olefin falling in the category claimed produced 100% heavy product. In the case of 2-methyl pentene-1, although 81% was heavy product the molecular weight was well below that obtained in accordance with this invention and was primarily olefinic.

Reaction temperature has a marked effect on the selectivity toward mono substituted benzene compounds. Low temperature favors the selective production of the mono substituted aryl compounds. Similarly, the low reaction temperatures promote the formation of high molecular weight product.

What is claimed is:

1. A process for the preparation of high molecular weight alkylated aromatic compounds which comprises reacting a benzene series compound with a $C_5$ to $C_8$ alpha olefin having the formula $CH_2=CH-R$, wherein R is a saturated branched hydrocarbon radical in the presence of a metal halide Lewis acid catalyst at temperatures not in excess of 50° C. and separating a telomer of said olefin and said benzene series compound.

2. A process in accordance with claim 1 wherein said benzene series compound is benzene.

3. A process in accordance with claim 2 wherein said olefin is 4-methyl pentene-1.

4. A process for producing a high molecular weight monoalkylated aromatic compound which comprises reacting benzene with a $C_5$ to $C_8$ alpha olefin having the formula $CH_2=CH-R$, wherein R is a saturated branched hydrocarbon radical in the presence of aluminum chloride at a temperature between −30° C. and +30° C. for a period of time sufficient to effect telomerization, and separating a product predominantly comprising a monoalkyl benzene, said alkyl group consisting of at least two monomeric units derived from said alpha olefin.

5. A process in accordance with claim 4 wherein R is a branched alkyl radical.

6. A process in accordance with claim 4 wherein R is a cycloalkyl radical.

7. A process in accordance with claim 5 wherein said olefin is 4-methyl pentene-1.

8. A process for preparing a long chain alkylated aromatic compound which comprises reacting a benzene series compound with a $C_5$ to $C_8$ alpha olefin having the formula $CH_2=CH-R$, wherein R is a branched alkyl radical in the presence of aluminum chloride at a temperature between $-30°$ C. and $+30°$ C. for a time sufficient to effect telomerization, and recovering a product predominantly comprising a long chain alkylated benzene containing in the alkyl group 2 to 15 times the number of carbon atoms in said olefin reactant.

9. A process in accordance with claim 8 wherein said olefin is 4-methyl pentene-1.

10. A process for preparing a long chain alkylated aromatic compound which comprises reacting benzene with 4-methyl pentene-1 in the presence of 0.1 to 10 wt. percent based on the olefin of aluminum chloride at a temperature between 0° C. and +30° C. for 30 minutes to 2 hours, and recovering a product predominantly comprising a long chain alkylated benzene containing in the alkyl group 12 to 90 carbon atoms.

References Cited in the file of this patent

UNITED STATES PATENTS

| | | |
|---|---|---|
| 2,440,800 | Hanford et al. | May 4, 1948 |
| 2,761,000 | Hervert et al. | Aug. 28, 1956 |
| 2,810,769 | Sanford et al. | Oct. 22, 1957 |
| 2,821,562 | Hervert et al. | Jan. 28, 1958 |
| 2,887,518 | Bloch et al. | May 19, 1959 |